US012606241B2

(12) United States Patent
Jank et al.

(10) Patent No.: US 12,606,241 B2
(45) Date of Patent: Apr. 21, 2026

(54) METHOD AND DRIVER ASSISTANCE SYSTEM FOR ASSISTED REVERSING WITH A VEHICLE-TRAILER COMBINATION AND MOTOR VEHICLE

(71) Applicant: Volkswagen Aktiengesellschaft, Wolfsburg (DE)

(72) Inventors: Dennis Jank, Hannover (DE); Philipp Hüger, Rühen (DE); Viktor Bradar, Štenovice (CZ); Dennis Imroth, Schandelah (DE); Havlík Jindrich, Plzen (CZ); Fehér Marek, Horní Bríza (CZ); Petr Batek, Plzen (CZ)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 1 day.

(21) Appl. No.: 18/772,423

(22) Filed: Jul. 15, 2024

(65) Prior Publication Data

US 2025/0026405 A1 Jan. 23, 2025

(30) Foreign Application Priority Data

Jul. 18, 2023 (DE) ..................... 10 2023 206 807.9

(51) Int. Cl.
B62D 13/06 (2006.01)
B62D 15/02 (2006.01)

(52) U.S. Cl.
CPC ........... B62D 13/06 (2013.01); B62D 15/025 (2013.01)

(58) Field of Classification Search
CPC .. B62D 13/06; B62D 15/025; B62D 15/0285; B60W 30/18036; B60W 30/09; B60W 40/02; B60W 50/0098; B60W 2552/50
See application file for complete search history.

(56) References Cited

U.S. PATENT DOCUMENTS

| | | | |
|---|---|---|---|
| 2014/0222228 A1 | 8/2014 | Sawa et al. .................... | 700/291 |
| 2014/0222288 A1* | 8/2014 | Lavoie .............. | B62D 15/0285 |
| | | | 701/99 |

(Continued)

FOREIGN PATENT DOCUMENTS

| | | | | |
|---|---|---|---|---|
| DE | 102015110697 A1 * | 1/2016 | ............. | B62D 13/06 |
| DE | 102017200218 A1 | 7/2018 | ............ | B60W 30/06 |

(Continued)

OTHER PUBLICATIONS

Machine Translation of EP 3744616 A1 PDF File Name: "EP3744616A1_Machine_Translation.pdf" (Year: 2020).*
Machine Translation of DE 102015110697 A1 PDF File Name: "DE102015110697A1_Machine_Translation.pdf" (Year: 2016).*

(Continued)

*Primary Examiner* — Grant Moubry
*Assistant Examiner* — Ruben Picon-Feliciano
(74) *Attorney, Agent, or Firm* — Slayden Grubert Beard PLLC

(57) ABSTRACT

The disclosure relates to a method and a driver assistance system for assisted reversing with a vehicle-trailer combination, wherein, initially when it is driven forwards, its forward trajectory is stored and objects arranged laterally next to the forward trajectory are detected. A reversing trajectory, which deviates as little as possible from the driven forward trajectory, is planned. The detected object is classified as a collision object if it lies in the planned reversing trajectory. In such case, a new reversing trajectory that is free of collision objects is generated. The trailer is reversed along the new reversing trajectory. A current deviation of an actual reversing trajectory of the trailer from the new reversing trajectory is thereby determined, and when the current deviation is greater than a permissible limit deviation, the trailer is stopped to allow performing a corrective action. The assisted reversing is resumed after corrective action has been performed.

20 Claims, 8 Drawing Sheets

(56)  References Cited

U.S. PATENT DOCUMENTS

| | | | | |
|---|---|---|---|---|
| 2014/0249691 A1* | 9/2014 | Hafner | | B62D 15/0285 |
| | | | | 701/1 |
| 2015/0197282 A1* | 7/2015 | Hochrein | | B62D 15/027 |
| | | | | 701/41 |
| 2016/0129939 A1 | 5/2016 | Singh et al. | | 701/41 |
| 2016/0229451 A1* | 8/2016 | Raad | | B62D 15/027 |
| 2018/0346024 A1* | 12/2018 | Lavoie | | B62D 15/027 |
| 2018/0354553 A1 | 12/2018 | Stroebel | | |
| 2019/0086204 A1 | 3/2019 | Critchley et al. | | |
| 2019/0337344 A1 | 11/2019 | Yu et al. | | |
| 2020/0369320 A1* | 11/2020 | Niewiadomski | | B60W 60/0025 |
| 2021/0171099 A1 | 6/2021 | Yamamoto et al. | | |
| 2022/0230544 A1 | 7/2022 | Niewiadomski et al. | | |
| 2023/0249675 A1 | 8/2023 | Prinzhausen et al. | | |

FOREIGN PATENT DOCUMENTS

| | | | | |
|---|---|---|---|---|
| DE | 102017219876 A1 | 7/2018 | | B60W 10/20 |
| DE | 102017209980 A1 | 12/2018 | | B60D 1/30 |
| EP | 2860084 B1 * | 12/2016 | | B62D 15/0285 |
| EP | 3344519 B1 | 6/2020 | | B62D 13/06 |
| EP | 3744616 A1 * | 12/2020 | | B60W 30/18036 |
| GB | 2398050 A * | 8/2004 | | B62D 15/029 |
| KR | 20230021730 A | 2/2023 | | B60W 30/06 |

OTHER PUBLICATIONS

Machine Translation of EP 2860084 B1 PDF File Name: "EP2860084B1_Machine_Translation.pdf" (Year: 2016).*
German Office Action, Application No. 102023206807.9, 7 pages, Nov. 3, 2024.

* cited by examiner

S6, S6.1

METHOD AND DRIVER ASSISTANCE SYSTEM FOR ASSISTED REVERSING WITH A VEHICLE-TRAILER COMBINATION AND MOTOR VEHICLE

CROSS-REFERENCE TO RELATED APPLICATIONS

This application claims priority to German Patent Application No. DE 10 2023 206 807.9, filed on Jul. 18, 2023 with the German Patent and Trademark Office. The contents the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The present disclosure relates to a method for assisted reversing with a trailer having a towing vehicle and a trailer vehicle coupled to the towing vehicle as well as a driver assistance system.

Reversing with a vehicle-trailer combination, to the towing vehicle of which a trailer is coupled, is often difficult for inexperienced drivers. Therefore, in modern motor vehicles today, assistance systems are offered more and more often to support the driver when reversing with a trailer vehicle. When driving forwards, the steering axle is the front-most of the axles of the trailer when viewed in the direction of travel, and the trailer vehicle is pulled. However, when reversing, the steering axle of the trailer is the rear-most axle of the trailer when viewed in the direction of travel, and the trailer vehicle is pushed. The trailer vehicle usually has a rigid axle, which forms the first axle of the trailer when reversing with the trailer. The pushing towing vehicle must therefore drive a driving corridor which swings out farther when reversing with the trailer in order to expediently steer the coupled trailer vehicle, because it is harder to steer due to its rigid axle. Therefore, this results in driving trajectories for the towing vehicle and for the trailer vehicle for driving forwards that each differ from the driving trajectories for reversing. It is often necessary to drive a path that has just been driven forwards with the trailer as exactly as possible backwards, for instance in order to let oncoming traffic pass at a bottleneck or to exit a narrow entry to a dead end backwards. But due to the different driving trajectories, it can occur that when driving forwards along the forward trajectory, objects are driven past that lie in the reversing trajectory as obstacles when reversing.

However, due to control technology requirements, conventional driver assistance systems that are designed to control steering of a motor vehicle do not allow a maximally possible steering angle to be performed with the steering of the motor vehicle, at least not when the motor vehicle is to be moved backwards by means of the driver assistance system. Therefore, if the driver has utilized the maximally possible steering angle when driving forwards on the path that should be reversed again as precisely as possible with the trailer vehicle, the conventional driver assistance systems are not able to independently drive the path backwards in one go. This may result in assisted reversing by means of the conventional driver assistance system being canceled, and the driver is on his own again. There is therefore a need for a system that solves this problem.

SUMMARY

A need exists to provide an assisted reversing with a vehicle-trailer combination that is particularly reliable and effortless for a driver.

The need is addressed by the subject matter of the independent claim(s). Embodiments of the invention are described in the dependent claims, the following description, and the drawings.

DESCRIPTION

Figure 1:
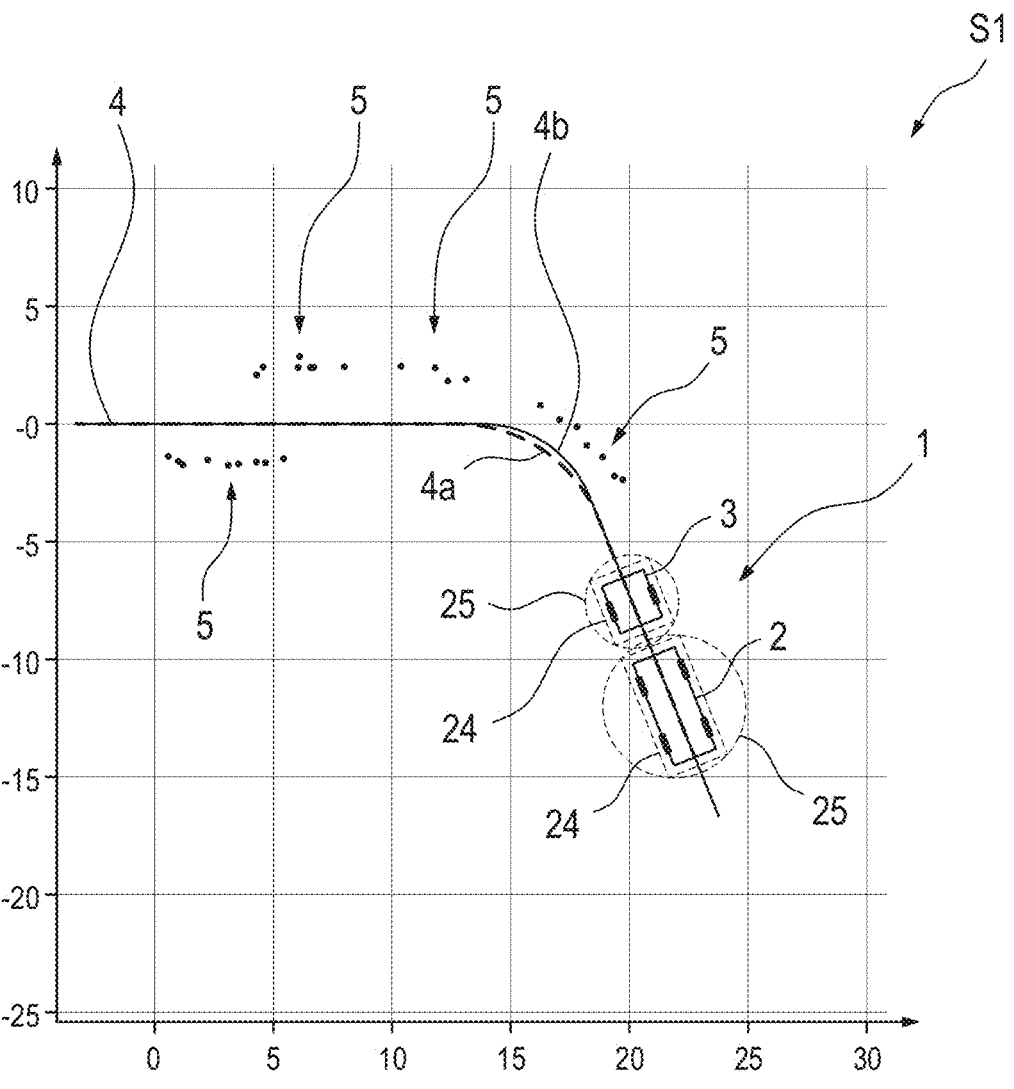
FIG. 1 an example schematic plan view of the vehicle-trailer combination when driving forwards.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for assisted reversing with a vehicle-trailer combination is proposed. The vehicle-trailer combination is referred to herein simply as a trailer and comprises a towing vehicle and a trailer vehicle coupled to the towing vehicle by means of a trailer coupling. One of the vehicles is equipped with a driver assistance system, which is configured to perform the method and is also part of the disclosure according to some embodiments. In some embodiments, the towing vehicle has the driver assistance system. It is also conceivable that the trailer has the driver assistance system such that one or more parts of the driver assistance system is/are arranged on board the towing vehicle and one or more parts of the same driver assistance system is/are arranged on board the trailer vehicle. Alternatively or additionally and in some embodiments, it is conceivable that one or more of the parts of the same driver assistance system is/are arranged externally of the trailer and/or towing vehicle, for example, as part of a distributed driver assistance system, e.g., using one or more data transmission interfaces. The parts discussed in the preceding may be any component of the driver assistance system, such as circuits, processors, modules, interfaces, units, etc. Furthermore, a motor vehicle, in particular a passenger car, is proposed in some embodiments, which has the driver assistance system and is configured to function as the towing vehicle for the trailer.

The method may in some embodiments be a computer-implementable method, which means that at least some of the steps of the method discussed in more detail in the following can be performed by means of a computer configured for electronic data processing. In this case, the teachings herein proposes both a computer program and a computer-readable storage medium, on which the computer program is stored. Upon execution of its program commands by a computer, the computer program causes said computer to perform the method for assisted reversing with the vehicle-trailer combination. The computer may for example be a part of the driver assistance system or one of or a group of the driver assistance system modules, optionally in combination with the trailer-external computer. The disclosure also proposes a computer program that, upon execution of its program commands by the computer or, respectively, the driver assistance system, causes said computer or, respectively, said driver assistance system to perform the method for assisted reversing with the vehicle-trailer combination. The driver assistance system modules explained in the following can thus be software modules or, respectively, program modules of the computer program. Solutions in software, hardware, and combinations thereof are conceivable.

In some embodiments of the method for assisted reversing with the trailer, in a step S1 of the method, the trailer is initially driven forward assisted or unassisted-meaning manually, purely by the human driver, or assisted completely or partially by a driver assistance system. A corresponding forward trajectory of the trailer is stored in the driver assistance system, for example, in a trajectory memory of the driver assistance system, which in some embodiments is designed as a ring memory. The forward trajectory of the trailer has a forward trajectory of the towing vehicle and a forward trajectory of the trailer vehicle; however, since they hardly deviate from each other when the trailer is driven forwards—in contrast to when the trailer is reversed—they are assumed to be the same in good approximation. By means of a sensor system of the towing vehicle, objects arranged laterally next to the forward trajectory are detected while driving forwards. The sensor system has, for example, ultrasonic, laser, radar, lidar, infrared, and/or camera sensors. Sensor data that is/was gathered by means of the sensor system and that characterizes objects next to the forward trajectory are provided to the driver assistance system, in particular as a point cloud. Positions of the objects are thus stored, for example, in an object memory of the driver assistance system.

During or after termination of forward travel and in some embodiments, a reversing trajectory for the trailer and corresponding vehicle-specific reversing corridors are planned in a step S2, for example by means of a reversing trajectory generation module of the driver assistance system.

The reversing trajectory of the trailer or, respectively, for the trailer is planned in this case such that it deviates as little as possible from the driven forward trajectory. The forward trajectory thus functions as a reference trajectory for the upcoming reversing. The vehicle- specific reversing corridors corresponding to the reversing trajectory of the trailer are planned separately for each vehicle of the trailer. Thus, a reversing corridor is planned for the towing vehicle, and a separate reversing corridor is planned for the trailer vehicle.

In some embodiments and a step S3, a classification of the detected objects takes place, for instance by means of an object classification module of the driver assistance system. The object detected in each case is classified as a collision object if the corresponding object lies in one or both of the planned reversing corridors. It possible, however, that the object detected in each case is classified as a non-collision object if it does not lie in any of the reversing corridors when reversing with the trailer.

In some embodiments and a step S4, if one or more of the detected objects has been classified as a collision object, a new reversing trajectory is generated for the trailer and, as a result, a separate new vehicle-specific reversing corridor is generated for each vehicle by means of the reversing trajectory generation module. The new vehicle-specific reversing corridor is generated in each case such that it deviates as little as possible from the reversing corridor planned in each case in step S2. The two new reversing corridors are, however, generated in any case such that the detected objects classified as collision objects now do not lie in any of the new vehicle-specific reversing corridors.

In some embodiments and a step S5, the trailer is reversed in a reversing assistance operating mode, which is performed, for example, by means of a vehicle control module of the driver assistance system, wherein the driver assistance system, in particular its vehicle control module, intervenes in transverse guidance of the towing vehicle at least such that the trailer is driven along the new reversing trajectory and, as a result, through the new vehicle-specific reversing corridors. The driver assistance system can be switched, for example, into the reversing assistance operating mode in that a driver of the towing vehicle makes a corresponding input to the driver assistance system, for instance issues a speech command or presses a button, etc. By activating the reversing assistance operating mode, in particular the vehicle control module of the driver assistance system is switched into active or, respectively, assisting operation.

In some embodiments and a step S6, a current deviation of an actual reversing trajectory of the trailer vehicle from the new reversing trajectory is determined by means of the driver assistance system, for example, by means of a deviation detection module of the driver assistance system, during assisted reversing. If the current deviation is greater than a permissible limit deviation, the trailer is in some embodiments (completely) stopped by means of the driver assistance system to perform a corrective action. In other words, the assisted reversing is deactivated, at least in order to be able to perform the corrective action. The corrective action can be performed completely or partially by the driver assistance system. However, it is just as conceivable for the corrective action to require intervention or cooperation of the driver. After the corrective action has been performed, the assisted reversing is resumed or, respectively, reactivated in some embodiments.

In the method or, respectively, by means of the driver assistance system, when the trailer is driven forwards, its driven forward trajectory may in some embodiments be recorded. The driven trajectory can be recorded, for example, continuously in the ring memory of the driver assistance system. For example, the trajectory is always stored for a specified driving path length that has been completed, for example, for the last 100 m, etc. The driver can drive in this case in practically any way. In this case, the aspect that the driver can utilize the full maximally possible steering angle of the towing vehicle is to be particularly emphasized. Because, due to the corrective action, a steering angle of the towing vehicle that is limited by the control technology can be compensated. The method thus solves the problem for assisted reversing that conventional driver assistance systems do not reproduce a maximally possible steering angle of the towing vehicle.

Thanks to the example method, a problem that an object that was driven past without a collision while driving forward can lead to a collision with the trailer when reversing along the forward trajectory is also solved. Furthermore, the method includes all possible trailer vehicles, since they do not need to have any special equipment/gear. Because during the assisted reversing, the driver assistance system is not (no longer) dependent on sensors of the trailer, since the reversing trajectory to be driven has already been detected by sensors during the preceding forwards driving. Rear sensors of the towing vehicle are often deactivated anyway during operation with a trailer vehicle to ensure that the driver is not provided with incorrect information. If it should occur that the reversing cannot be performed or cannot be continued, it is provided in particular in the method that the assistance is canceled, and the control of the trailer is (once again) transferred completely to the human driver or the reversing assistance operating mode is not activated in the first place-optionally with the output of a notice to the driver. It is conceivable in some embodiments that the method uses a static map, on the basis of which the driver assistance system intervenes in the transverse guidance of the towing vehicle. It is also conceivable that the driver is warned by means of the driver assistance system when it determines that the planned reversing cannot be performed. It is understood that geometric properties of the towing and trailer vehicles must be provided to the driver assistance system in advance in order to perform the method. For example, the user can write in dimensions of the trailer vehicle into the driver assistance system via a human-machine interface. Furthermore, it can be provided that the user also inputs dimensions of the towing vehicle into the driver assistance system, for instance when the towing vehicle deviates from its standard dimensions due to additional equipment or load.

In some embodiments, it is provided that the driver assistance system completely takes over the transverse guidance of the towing vehicle and/or longitudinal guidance of the towing vehicle in step S5. This completely removes the human driver as a possible source of error from the control of the trailer when reversing with the trailer. This ensures, for example, that the driver completes the reversing too quickly, which could impair driving stability. Thus, this takes place fully autonomously with the trailer.

In some embodiments, the corrective action comprises the following: In a step S6.1, a deviation point is determined by means of the driver assistance system, for example, by means of a deviation detection module of the driver assistance system, which deviation point lies on the new reversing trajectory and at which the deviation of the actual trailer vehicle reversing trajectory has exceeded the limit deviation. In a step S6.2, it is then provided that-by means of the driver and/or by means of the driver assistance system-a forward correction is performed, during which the trailer is driven forwards. Thus, to perform the forward correction, the direction of travel of the trailer is switched. Then, in a step S6.3, a corrected reversing trajectory is generated by means of the driver assistance system, for example, by means of the reversing trajectory generation module. This trajectory has two trajectory portions, namely a first trajectory portion and a second trajectory portion adjoining the first. The first trajectory portion connects an end position of the trailer, which it has reached after the forward correction, and the deviation point. The second trajectory portion connects the deviation point and an end of the new reversing trajectory. In particular and in some embodiments, it is provided that the second trajectory portion is planned such that, between the deviation point and the end of the new reversing trajectory, it deviates from the new reversing trajectory as little as possible. It can also be provided that a previously successfully completed portion of the new reversing trajectory is deleted in order to save storage capacity. In a step S6.4, the trailer is reversed with the aid of the driver assistance system, wherein the driver assistance system intervenes in transverse guidance of the towing vehicle at least such that the trailer is driven along the corrected reversing trajectory. As a result, reversing with the trailer is designed particularly simply or, respectively, with as little effort as possible for the human driver.

In this context, some embodiments provide that the driver assistance system completely takes over the transverse guidance of the towing vehicle and/or longitudinal guidance of the towing vehicle in step S6.4. In other words, reversing with the trailer along the corrected reversing trajectory takes place fully autonomously, which is even easier for the driver and as a result of which the driver is removed as a source of error from the control of the trailer.

In some embodiments, an ideal end position for the forward correction is planned by means of the driver assistance system. This is characterized for example in that it can be achieved particularly simply or, respectively, efficiently with the trailer and is exactly far enough away from the new reversing trajectory that returning to the new reversing trajectory after the forward correction is particularly simple. By means of the driver assistance system, a correction trajectory toward the ideal end position is then planned for the forward correction, for example, by means of the reversing trajectory generation module. The forward correction along the correction trajectory is then performed-by means of the driver and/or by means of the driver assistance system. Before, simultaneously, or after, the first trajectory portion, which is, as described above, part of the corrected reversing trajectory, is planned between the ideal end position and the deviation point by means of the driver assistance system.

In some embodiments, complete control of longitudinal and transverse guidance of the towing vehicle is transferred to its human driver to perform the forward correction, following which the driver performs the forward correction with the trailer. However, the driver can be supported by the driver assistance system-even if said system does not actively intervene in longitudinal and/or transverse guidance of the towing vehicle-for instance in that the driver is shown the forward correction to be driven, for example, on a display of the towing vehicle. In this case, the driver should monitor the surroundings of the trailer during the forward correction to ensure that the trailer does not collide with an object during the forward correction.

In some embodiments, it is provided that the driver assistance system completely takes over the transverse guidance of the towing vehicle and/or longitudinal guidance of the towing vehicle to perform the forward correction. This means that performing the forward correction is performed partially or fully autonomously, which further relieves the driver.

It is provided in particular that the steps S1 to S5 are applied analogously in order to perform the forward correction and to return to the new reversing trajectory via the deviation point.

The current deviation of the actual trailer vehicle reversing trajectory from the new reversing trajectory is determined in some embodiments in that, during the reversing assisted by means of the driver assistance system, a Euclidean distance between the actual trailer vehicle reversing trajectory and the current position point is determined at a current position point of the trailer lying on the new reversing trajectory. Alternatively or additionally and in some embodiments, the current deviation is determined in that, during reversing, an angle between a tangent branching off from the new reversing trajectory at the current position point and a tangent of the actual trailer vehicle reversing trajectory is determined at the current position point of the trailer. This allows a deviation of the trailer vehicle to be detected particularly simply and reliably.

In some embodiments, one (first) imaginary collision rectangle is specified to the driver assistance system for each vehicle of the trailer, which rectangle completely encloses the corresponding vehicle and moves along with the vehicle. It is provided here that a geometric center of area of the collision rectangle lies on a longitudinal center axis (X-axis) of the vehicle. A transverse axis (Y-axis) of the vehicle and a transverse axis of the collision rectangle are also arranged at least parallel to each other. The collision rectangle is specified for each vehicle in particular such that an outer contour of the associated vehicle and the edges of the collision rectangle are spaced apart from each other by a first safety distance, which is less than 75 cm, for example less than 50 cm, in particular 25 cm. An imaginary circle is also specified to the driver assistance system for each vehicle of the trailer, on which circle the vertices of the associated collision rectangle always lie. The circle, like the collision rectangle, thus moves along with the corresponding vehicle when it is moved. In these embodiments, it is also provided that the detected objects are each classified, for example, by means of the object classification module of the driver assistance system, as a critical object if the corresponding object is intersected by one or both circles during forward travel. It is possible, on the other hand, that the detected object in each case is classified as a non- critical object if the corresponding object is not intersected by either of the circles of the vehicles when driving past. Then, in step S3 of the method, only those of the detected objects that would be intersected by the collision rectangle during reversing assisted by means of the driver assistance system are each classified as a collision object. In this way, computing power can be reduced, since the number of objects to be classified is lower than in the case that all objects detected by means of the sensor system would be classified, wherein this then includes objects that are irrelevant for planning collision-free reversing.

In conjunction with the collision rectangle, it is provided in some embodiments that a second imaginary collision rectangle, which lies completely within the first collision rectangle, and a third imaginary collision rectangle, which lies completely within the second collision rectangle, are specified for each vehicle. In particular, the collision rectangles are concentric to each other, meaning they share a common center of area, which lies on the longitudinal center axis of the vehicle. In some embodiments, the edges of the first collision rectangle and the outer contour of the associated vehicle are spaced apart from each other by the first safety distance, which is, for example, 75 cm. The edges of the second collision rectangle and the edges of the first collision rectangle are spaced apart from each other, for example, by 25 cm, as a result of which the edges of the second collision rectangle and the outer contour of the associated vehicle are spaced apart from each other by a second safety distance of 50 cm. Furthermore, the edges of the third collision rectangle and the edges of the second collision rectangle are spaced apart from each other, for example, by 25 cm, as a result of which the edges of the third collision rectangle and the outer contour of the associated vehicle are spaced apart from each other by a third safety distance of 25 cm. This is to be understood only as one possible example: other distances between the edges of the collision rectangles or, respectively, between the collision rectangles and the outer contour of the associated vehicle are of course possible. In this case, when reversing assisted by means of the driver assistance system, the collision object in each case is classified, for instance by means of the object classification module, as a notice object as long as the corresponding collision object is intersected by the first collision rectangle but not by the second collision rectangle or by the third collision rectangle. In response to the notice object, a notice action is performed by means of the driver assistance system. For example, it is communicated to the driver that the trailer is approaching the collision object and/or a driving speed of the trailer is reduced and/or the complete or partial resumption of control of the trailer is offered to the driver. Further, the collision object in each case is classified during assisted reversing as a warning object as long as the corresponding collision object is intersected by the first collision rectangle and by the second collision rectangle but not by the third collision rectangle, wherein a warning action is performed by means of the driver assistance system in response to the warning object. For example, it is communicated to the driver that the trailer is in danger of a collision and/or a driving speed of the trailer is reduced further/more and/or the complete resumption of control of the trailer is recommended to the driver with high urgency. If the collision object enters the innermost of the collision rectangles, meaning the third collision rectangle, a collision emergency action can be performed. For example, it is communicated to the driver that a collision is immediately imminent and/or the trailer is completely stopped and/or the control of the trailer is once again given completely to the driver. In this way, a three-stage warning system can be easily implemented, by means of which it is enabled to more clearly inform the driver of the trailer about potential risks and/or, in the case of automatic braking, to brake gradually before the driver is surprised by emergency braking.

To plan or, respectively, generate the new reversing trajectories or, respectively, the new vehicle-specific reversing corridors, a further possible embodiment provides that departing from the initially planned reversing trajectory is planned. For this purpose, a perpendicular, which intersects the outer contour point, to the tangent of the reversing trajectory is positioned at a problem point of the reversing trajectory initially planned in step S2, at which the reversing trajectory and the outer contour point of a collision object are spaced apart from each other by a minimum distance. In this case, those of the tangents of the reversing trajectory that branch off from the reversing trajectory at the problem point are used. On a side of the reversing trajectory lying opposite the outer contour point, a new planning point is then placed as a straight-line extension of the perpendicular, wherein a trajectory offset distance is formed between the initially planned reversing trajectory and the new planning point. Said distance is in any case greater than zero, but is nevertheless selected such that it is as close as possible to the initially planned reversing trajectory. It is selected—at least during the first planning of the departure—at most as long as the driver assistance system assesses that it is possible in a first approximation for the trailer to pass the problem point without a collision. In particular, the trajectory offset distance is limited by a sensor range of the sensor system of the towing vehicle, which sensor range is approximately four meters in each case perpendicularly and laterally to the corresponding trajectory that is driven with the towing vehicle. In other words, the new planning point is arranged at most on a lateral outer limit of the sensor range of the sensor system of the towing vehicle. For example, the trajectory offset distance is at most four meters when the perpendicular-lateral sensor range of the sensor system is four meters. On the initially planned reversing trajectory, a departure point is then determined, which lies, with reference to the reversing direction, before the problem point on the initially planned reversing trajectory. This means that, if the reversing trajectory continued to be driven, the trailer would first reach the departure point and then the problem point. In step S4, a new reversing trajectory portion and, as a result, new vehicle-specific reversing corridor portions for each vehicle for departing from the initially planned reversing trajectory are planned, for example, by means of the reversing trajectory generation module, between the departure point and the new planning point.

If it is determined when planning the new vehicle-specific reversing corridor portions or, respectively, the new reversing trajectory portion for departing from the initially planned reversing trajectory that driving these new reversing corridor portions would lead to a secondary collision, it is provided in some embodiments that planning the new vehicle-specific reversing corridor portions for departing from the initially planned reversing trajectory is restarted or, respectively, repeated. A secondary collision is, for example, a collision with another of the detected objects or with the same object but with a different vehicle of the trailer, or with the correspondingly other of the vehicles of the trailer. Such a secondary collision becomes relevant only when the planning of the departure from the initially planned reversing trajectory has been performed at least once. The repeated planning then takes place on the basis that the new planning point is spaced apart from the initially planned reversing trajectory by a greater trajectory offset distance than during the first pass in order to also avoid the secondary collision. The new planning point is thus shifted farther in the direction of the sensor range limit of the sensor system, but in this case also not past it. This repeated planning may be necessary, for example, if, according to the first planning, the trailer vehicle could be steered without a collision along the associated new reversing corridor portion, but to do so the towing vehicle had to deviate further from the initially planned reversing trajectory and as a result would collide with one of the detected objects. Alternatively or additionally and in some embodiments, it can be provided that the repeated planning takes place on the basis of a departure point lying closer to the trailer, such that steering of the towing vehicle that swings out in a less pronounced manner is sufficient to drive around the relevant collision point with the trailer.

In some embodiments, returning to the initially planned reversing trajectory is also planned. For this purpose, on the initially planned reversing trajectory, a return point is determined, which lies, with reference to the reversing direction, after the problem point on the initially planned reversing trajectory. This means that, if the reversing trajectory continued to be driven, the trailer would first reach the problem point and then the return point. In step S4, an additional new reversing trajectory portion and, as a result, additional new vehicle-specific reversing corridor portions for each vehicle for returning to the initially planned reversing trajectory are planned, for example, by means of the reversing trajectory generation module, between the new planning point and the return point.

If it is determined when planning the new vehicle-specific reversing corridor portions or, respectively, the new reversing trajectory portion for returning to the initially planned reversing trajectory that driving these new reversing corridor portions would lead to a further/another collision, it is provided in some embodiments that planning the new vehicle-specific reversing corridor portions for returning to the initially planned reversing trajectory is restarted or, respectively, repeated. The further/other secondary collision becomes relevant only when the planning of the return to the initially planned reversing trajectory has been performed at least once. The repeated planning then takes place on the basis that a return point lying farther away from the trailer is determined such that steering with the towing vehicle that swings out in a less pronounced manner is sufficient to drive around the relevant collision point with the trailer. Alternatively or additionally and in some embodiments, it can be provided that the planning of the departure from the initially planned reversing trajectory is repeated as described above and in doing so the new planning point is shifted even farther towards the sensor range limit of the sensor system. In some embodiments of the method, in planning the departure or, respectively, return, the initially planned reversing trajectory is beneficially only deviated from to a particularly small degree.

Some embodiments provide that the departure from the initially planned reversing trajectory and the return to the initially planned reversing trajectory is planned for the entire planned reversing trajectory before the driver assistance system or, respectively, its vehicle control module intervenes in the transverse guidance of the towing vehicle for the first time. In other words, a planning horizon reaches until the end of the planned reversing trajectory. This enables particularly reliable and fluid reversing assistance.

In some embodiments, the departure from the initially planned reversing trajectory is planned as soon as it is determined by means of the driver assistance system that a specified minimum planning distance between a current position of the trailer and the problem point has been reached. Returning to the initially planned reversing trajectory is planned in this case when the trailer is located on the new reversing trajectory portion. In this case, the planning horizon covers only a part of the planned reversing trajectory, as a result of which computing power required for the method can be reduced. This means the method can be performed particularly efficiently.

Reference will now be made to the drawings in which the various element of embodiments will be given numerical designation and in which further embodiments will be discussed.

In the embodiments describe herein, the described components of the embodiments each represent individual features that are to be considered independent of the another, in the combination as shown or described, and in combinations other than shown or described. In addition, the described embodiments can also be supplemented by features other than those described.

Specific references to components, process steps, and other elements are not intended to be limiting.

In the following, a method for assisted reversing with a trailer 1, a driver assistance system configured to perform the method, and a motor vehicle having the driver assistance system are described together. Identical or functionally identical elements are provided with the same reference sign in the FIGS.

The trailer 1 is a vehicle-trailer combination having a towing vehicle 2 and a trailer vehicle 3 coupled to the towing vehicle 2 by means of a trailer coupling. One of the vehicles 2, 3, in the present case the towing vehicle 2, is equipped with a driver assistance system, which is configured to perform the method. The towing vehicle 2 is designed here as a passenger car.

In the method for assisted reversing with the trailer 1, the trailer 1 is initially driven forwards in a step S1 of the method. This is shown in FIG. 1, which shows a schematic plan view of the trailer 1 while driving forwards. A forward trajectory 4 of the trailer 1 characterizing the forward travel is stored in a trajectory memory of the driver assistance system designed as a ring memory. A forward trajectory 4a of the towing vehicle 2 and a forward trajectory 4b of the trailer vehicle 3 barely deviate from each other when the trailer 1 is driven forwards, such that they can be assumed to be the same. By means of a sensor system of the towing vehicle 2, a point cloud is detected while driving forwards, which detects objects 5 arranged laterally next to the forward trajectory 4. The point cloud detected by means of the sensor system is stored in an object memory of the driver assistance system.

Figure 2:
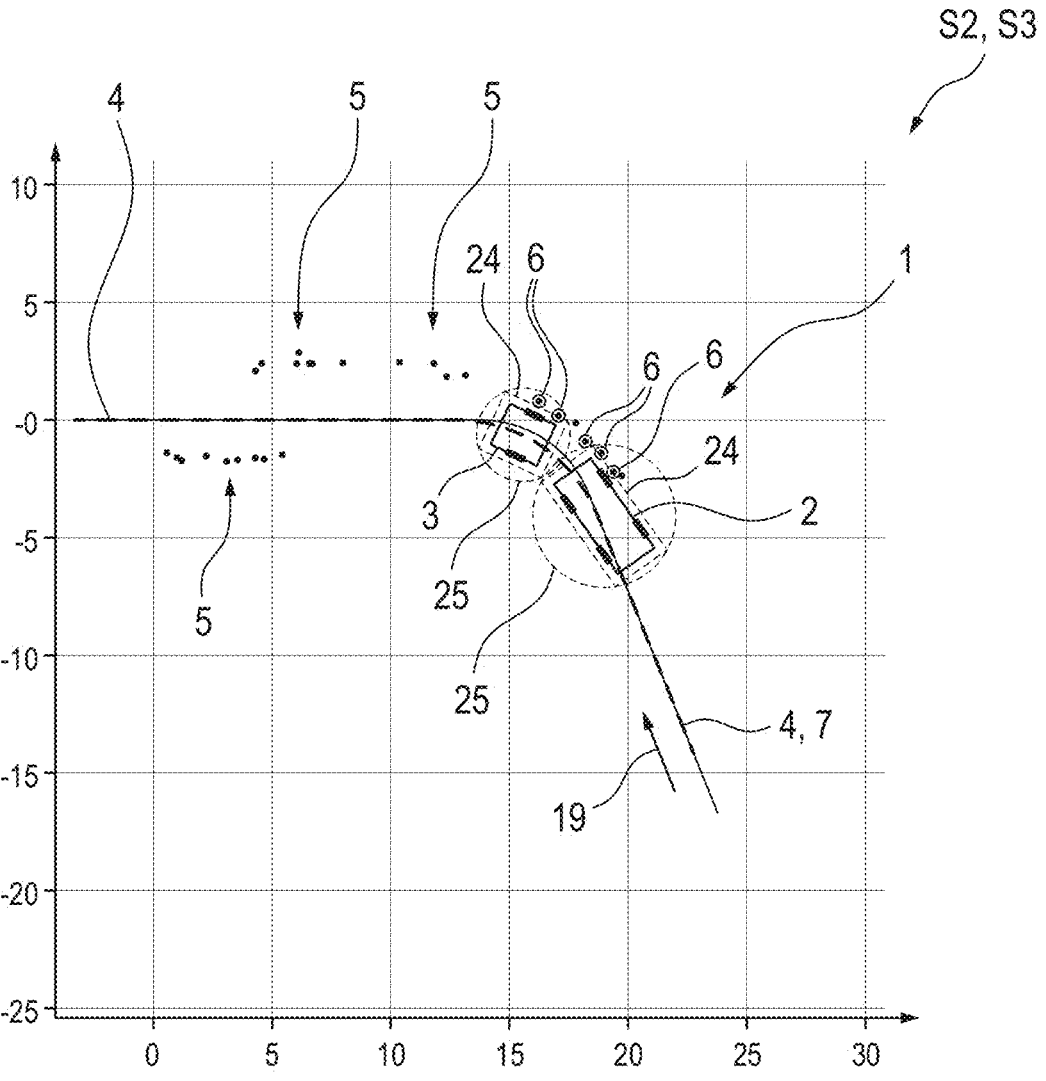
FIG. 2 an example schematic plan view of the vehicle-trailer combination in simulated reversing, wherein objects that were detected when driving forwards are each classified as a collision object.

FIG. 2 shows a schematic plan view of the trailer 1 in simulated reversing, wherein the objects 5 that were detected when driving forwards are each classified as a collision object 6. During or after termination of forward travel, a reversing trajectory 7 for the trailer 1 and corresponding vehicle-specific reversing corridors 8, 9 (see FIG. 3) are planned for the vehicles 2, 3 in a step S2, in this example by means of a reversing trajectory generation module of the driver assistance system. The reversing trajectory 7 of the trailer 1 is planned in this case such that it deviates as little as possible from the driven forward trajectory 4.

The forward trajectory 4 thus functions as a reference trajectory for the upcoming reversing. The vehicle-specific reversing corridors 8, 9 corresponding to the reversing trajectory 7 are planned separately for each vehicle 2, 3. Thus, a reversing corridor 8 for the towing vehicle 2 and a reversing corridor 9 for the trailer vehicle 3 are planned. In a step S3 of the method, a classification of the detected objects 5 takes place, in the present case by means of an object classification module of the driver assistance system. The object 5 detected in each case is classified as a collision object 6 if the corresponding object lies in one or in both of the planned reversing corridors 8, 9. For this purpose, for example, reversing along the reversing trajectory 7 initially planned in step S2 is simulated, as shown in FIG. 2.

Figure 3:
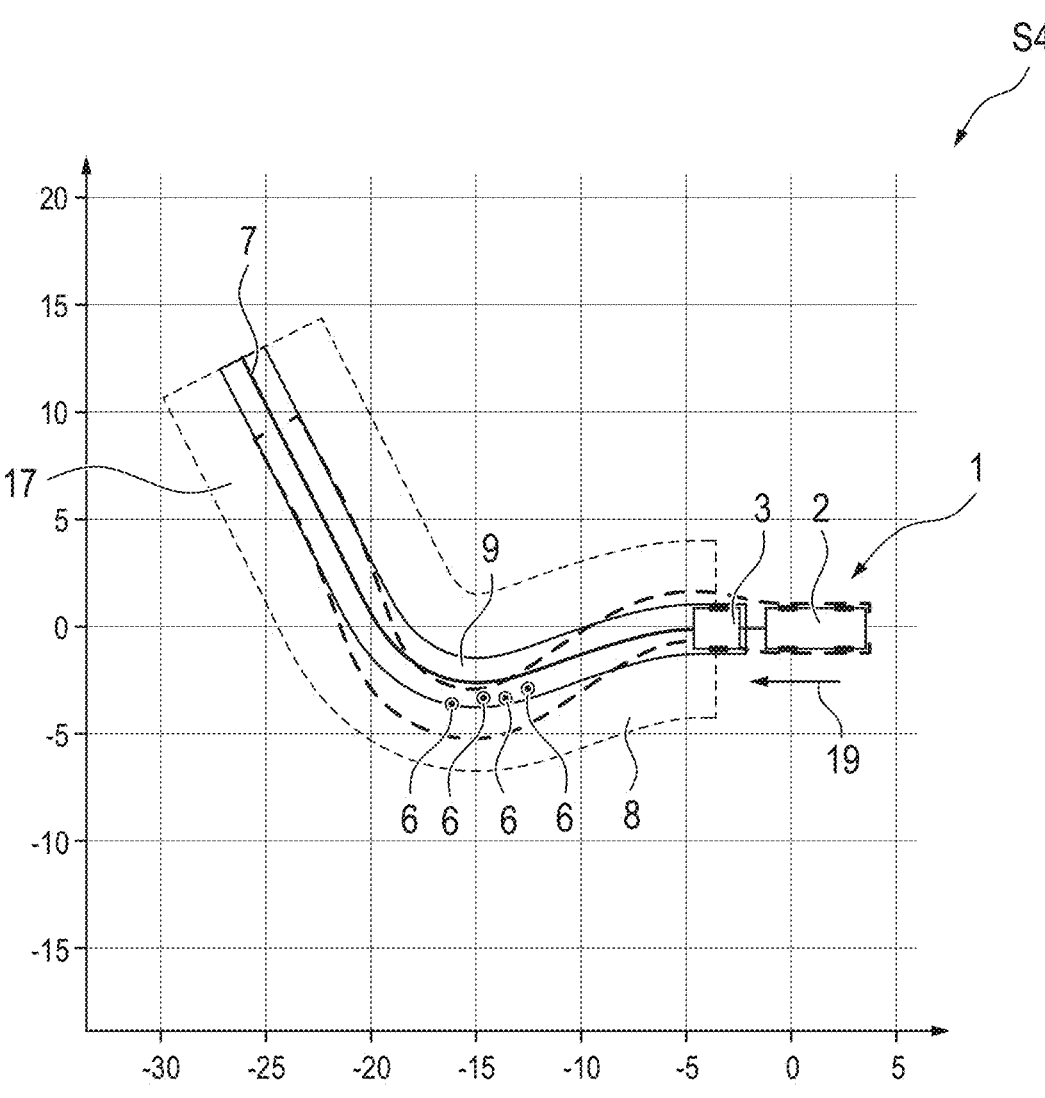
FIG. 3 an example schematic plan view of the vehicle-trailer combination at the beginning of reversing assisted by means of a driver assistance system, wherein objects prevent reversing without collisions.

FIG. 3 shows a schematic plan view of the trailer 1 at the beginning of reversing assisted by means of a driver assistance system, wherein collision objects 6 initially prevent reversing of the trailer 1 without collisions. Because, as can be seen, collision objects 6 lie in the reversing corridor 9 of the trailer vehicle 3. In such a case, a step S4 of the method provides that a new reversing trajectory 7a (see FIG. 6) and, as a result, for each vehicle 2, 3, a new vehicle-specific reversing corridor 8a, 9a are generated in each case (see FIG. 6) by means of the reversing trajectory generation module. The new vehicle-specific reversing corridor 8a, 9a is generated in each case such that it deviates as little as possible from the reversing corridor 8, 9 planned in each case in step S2. The two new reversing corridors 8a, 9a are, however, generated in any case such that the collision objects 6 do not lie in either of the new vehicle-specific reversing corridors 8a, 9a.

Figure 4:
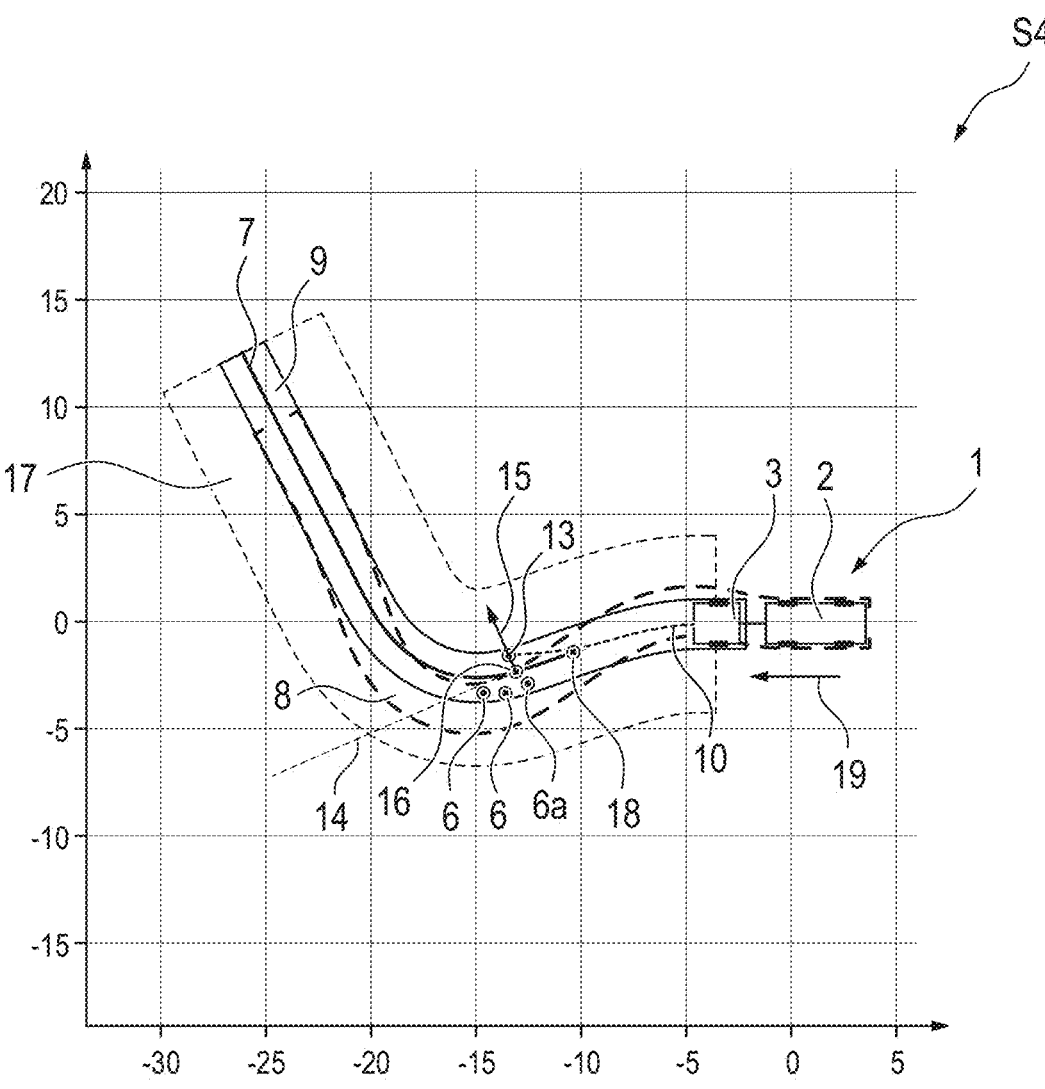
FIG. 4 an example schematic plan view of the vehicle-trailer combination, wherein departing from an initially planned reversing trajectory is planned.
Figure 5:
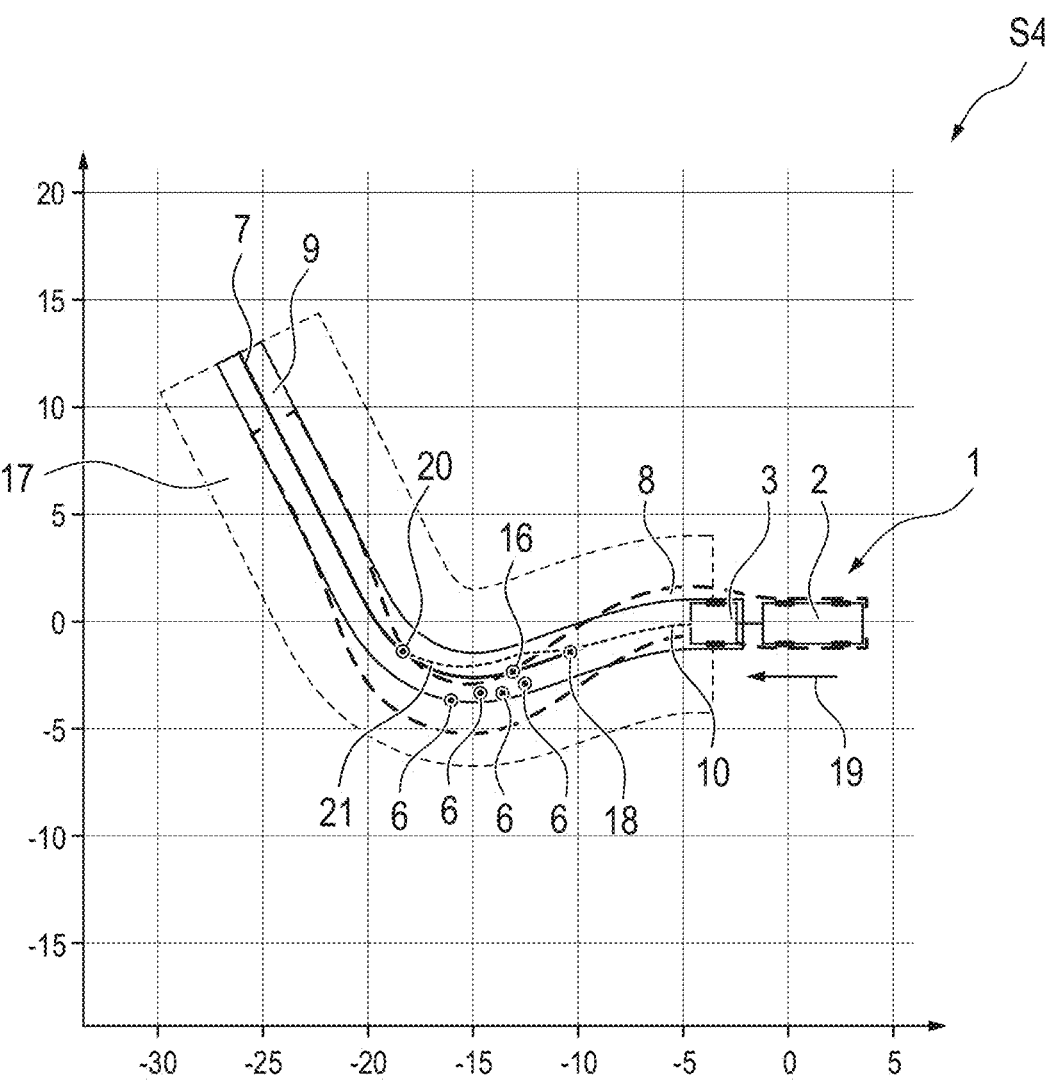
FIG. 5 an example schematic plan view of the vehicle-trailer combination, wherein returning to an initially planned reversing trajectory is planned.

FIG. 4 shows a schematic plan view of the trailer 1, wherein departing from the planned reversing trajectory 7 is planned, as a result of which a first new reversing trajectory portion 10 and, as a result, first new vehicle-specific reversing corridor portions 11, 12 (see FIG. 6) are planned for departing from the initially planned reversing trajectory 7. For this purpose, a problem point 13 lying on the reversing trajectory 7 initially planned in step S2 is determined, at which the reversing trajectory 7 and an outer contour point 6a of a collision object 6 are spaced part from each other by a minimum distance. Then a tangent 14 of the reversing trajectory 7 that branches off in the problem point 13 is determined. Then a perpendicular 15, which intersects the outer contour point 6a, to the tangent 14 is positioned. On a side of the reversing trajectory 7 lying opposite the outer contour point 6a, a new planning point 16 is then arranged as a straight-line extension of the perpendicular 15, wherein a trajectory offset distance is formed between the initially planned reversing trajectory 7 and the new planning point. Said distance is in any case greater than zero, but is nevertheless selected such that it is as close as possible to the initially planned reversing trajectory 7. It is selected—at least during the first planning of the departure—at most as long as the driver assistance system assesses that it is possible in a first approximation for the trailer 1 to pass the problem point 13 without a collision. In particular, the trajectory offset distance is limited by a sensor range 17 of the sensor system of the towing vehicle 2, which sensor range is approximately four meters in each case perpendicular- laterally to the corresponding trajectory 4, 7, 7a that is driven with the towing vehicle 2. On the initially planned reversing trajectory 7, a departure point 18 is then determined, which lies, with reference to the reversing direction 19, before the problem point 13 on the initially planned reversing trajectory 7. In step S4, the first new reversing trajectory portion 10 and, as a result, for each vehicle 2, 3, the new vehicle-specific reversing corridor portions 11, 12 for departing from the initially planned reversing trajectory 7 are planned, in the example here by means of the reversing trajectory generation module, between the departure point 18 and the new planning point 16.

If it is determined when planning the new vehicle-specific reversing corridor portions 11, 12 or, respectively, the new reversing trajectory portion 10 for departing from the initially planned reversing trajectory 7 that driving these new reversing corridor portions 10, 11 would lead to a secondary collision, it is provided that planning the new vehicle-specific reversing corridor portions 11, 12 is restarted or, respectively, repeated. The repeated planning then takes place on the basis that the new planning point 16 is spaced apart from the initially planned reversing trajectory 7 by a greater trajectory offset distance than during the first pass in order to also avoid the secondary collision. Alternatively or additionally, the repeated planning takes places on the basis of a departure point 18 lying closer to the trailer 1.

In the present case, returning to the initially planned reversing trajectory 7 is also planned. For this purpose, on the initially planned reversing trajectory 7, a return point 20 is determined, which lies, with reference to the reversing direction 19, after the problem point 13 on the initially planned reversing trajectory 7. In step S4, a second new reversing trajectory portion 21 and, as a result, for each vehicle, a second new vehicle-specific reversing corridor portion 22, 23 for returning to the initially planned reversing trajectory 7 are planned, here by means of the reversing trajectory generation module, between the new planning point 16 and the return point 20.

If it is determined when planning the second new vehicle-specific reversing corridor portions 22, 23 or, respectively, the new reversing trajectory portion 21 for returning to the initially planned reversing trajectory 7 that driving these new reversing corridor portions 22, 23 would lead to a further/another secondary collision, it is provided that planning the second new vehicle- specific reversing corridor portions 22, 23 is restarted or, respectively, repeated. The repeated planning then takes place on the basis that a return point 20 lying farther away from the trailer 1 is determined. Alternatively or additionally, planning the departure from the initially planned reversing trajectory 7 is repeated as described above, wherein the new planning point 16 is shifted even farther toward an edge of the sensor range 17.

Figure 6:
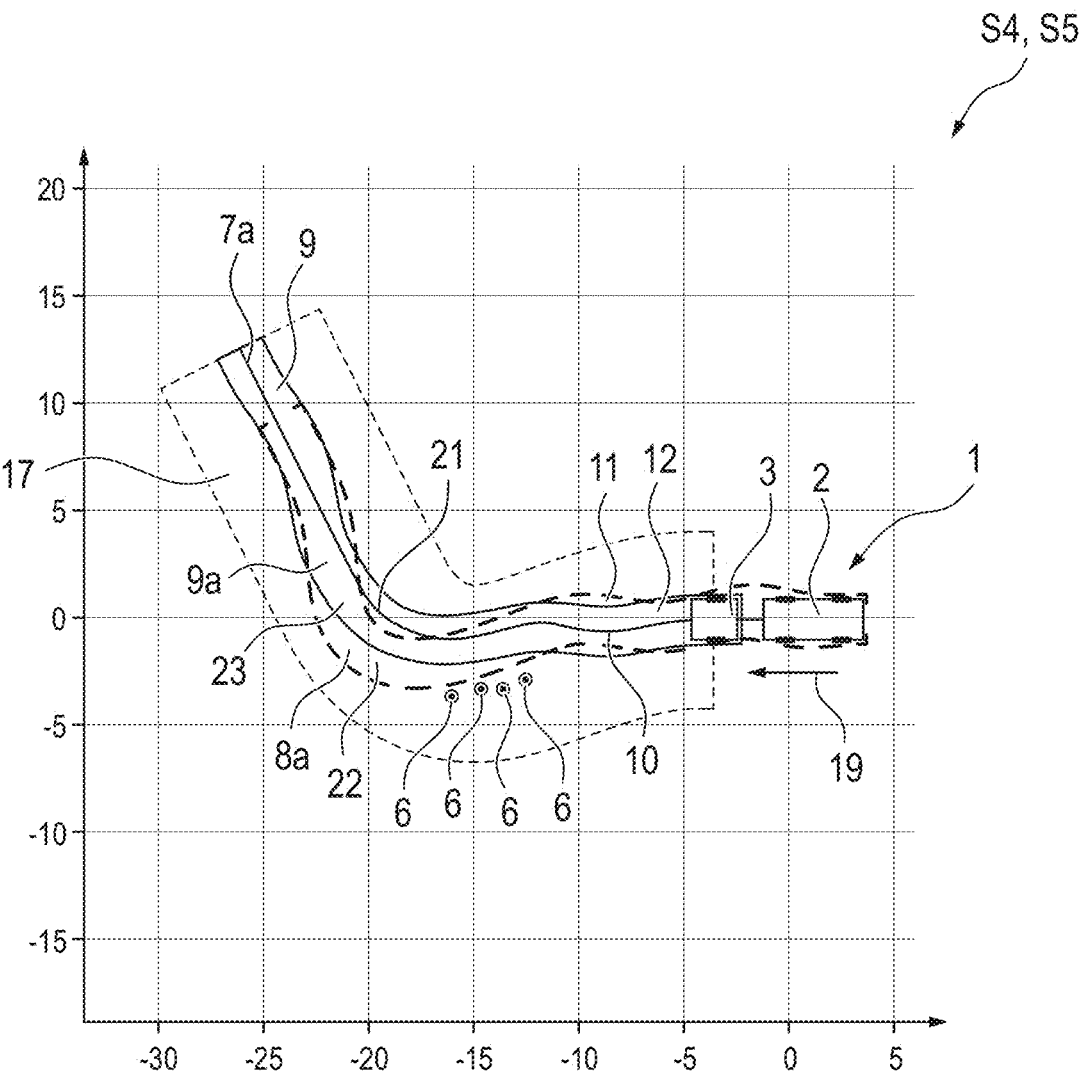
FIG. 6 an example schematic plan view of the vehicle-trailer combination, for which a collision-free reversing trajectory has been planned.

FIG. 6 shows a schematic plan view of the trailer 1, for which the collision-free, new reversing trajectory 7a is/has been planned. Based on the new reversing trajectory 7a, the trailer 1 is reversed in a reversing assistance operating mode with the aid of a vehicle control module of the driver assistance system, wherein the vehicle control module of the driver assistance system intervenes in transverse guidance of the towing vehicle 2 at least such that the trailer 1 is driven along the new reversing trajectory 7a having the new reversing trajectory portions 10, 21 and, as a result, through the new vehicle-specific reversing corridors 8a, 9a, which have the new reversing corridor portions 11, 12, 22, 23. In the present case, the driver assistance system completely takes over the transverse guidance of the towing vehicle 2 and/or longitudinal guidance of the towing vehicle 2 in step S5.

The departure from the initially planned reversing trajectory 7 and the return to the initially planned reversing trajectory 7 can be planned in advance for the entire initially planned reversing trajectory 7 before the driver assistance system or, respectively, its vehicle control module intervenes in the transverse guidance of the towing vehicle 2 for the first time. Alternatively, the departure from the initially planned reversing trajectory 7 is planned as soon as it is determined by means of the driver assistance system that a specified minimum planning distance between a current position of the trailer 1 and the problem point 13 has been reached. Returning to the initially planned reversing trajectory 7 is planned in this case when the trailer 1 is located on the first new reversing trajectory portion 10.

Once again with reference to FIG. 1 and FIG. 2, it will be explained that, according to the presently described example, a first imaginary collision rectangle 24 is specified to the driver assistance system for each vehicle 2, 3, which rectangle completely encloses the corresponding vehicle 2, 3 and moves along with the vehicle 2, 3. In the present case, the collision rectangle 24 is specified in each case such that an outer contour of the associated vehicle 2, 3 and the edges of the collision rectangle 24 are spaced apart from each other by a first safety distance of 25 cm. An imaginary circle 25 is also specified to the driver assistance system for each vehicle 2, 3, on which circle the vertices of the associated collision rectangle 24 always lie. It is also provided in the example that the detected objects 5 are each classified as a critical object if the corresponding object 5 has been intersected by one or both of the circles 25 when driving forwards. Then, in step S3 of the method, only those of the detected objects 5 that would be intersected by the collision rectangle 24 during reversing assisted by means of the driver assistance system are each classified, if applicable, as a collision object 6.

Optionally, a second imaginary collision rectangle, which lies completely within the first collision rectangle 24, and a third imaginary collision rectangle, which lies completely within the second collision rectangle, are specified for each vehicle 2, 3. In this case, the edges of the first collision rectangle 24 and the outer contour of the associated vehicle are then spaced apart from each other by the first safety distance, which is then 75 cm. The edges of the second collision rectangle and the edges of the first collision rectangle 24 are spaced apart from each other, for example, by 25 cm, as a result of which the edges of the second collision rectangle and the outer contour of the associated vehicle 2, 3 are spaced apart from each other by a second safety distance of 50 cm. Furthermore, the edges of the third collision rectangle and the edges of the second collision rectangle are spaced apart from each other, for example, by 25 cm, as a result of which the edges of the third collision rectangle and the outer contour of the associated vehicle 2, 3 are spaced apart from each other by a third safety distance of 25 cm. In this case, when reversing assisted by means of the driver assistance system, the collision object 6 in each case is classified as a notice object as long as the corresponding collision object 6 is intersected by the first collision rectangle 24 but not by the second collision rectangle or by the third collision rectangle. In response to the notice object, a notice action is performed by means of the driver assistance system. For example, it is communicated to the driver that the trailer 1 is approaching the collision object 6 and/or a driving speed of the trailer 1 is reduced and/or the complete or partial resumption of control of the trailer 1 is offered to the driver. Further, the collision object 6 in each case is classified during assisted reversing as a warning object as long as the corresponding collision object 6 is intersected by the first collision rectangle 24 and by the second collision rectangle but not by the third collision rectangle, wherein a warning action is performed by means of the driver assistance system in response to the warning object. For example, it is communicated to the driver that the trailer 1 is in danger of a collision and/or a driving speed of the trailer 1 is reduced further/more and/or the complete resumption of control of the trailer 1 is recommended to the driver with high urgency. If the collision object 6 enters the innermost of the collision rectangles, meaning the third collision rectangle, a collision emergency action can be performed. For example, it is communicated to the driver that a collision is immediately imminent and/or the trailer 1 is completely stopped and/or the control of the trailer 1 is once again given completely to the driver.

Figure 7:
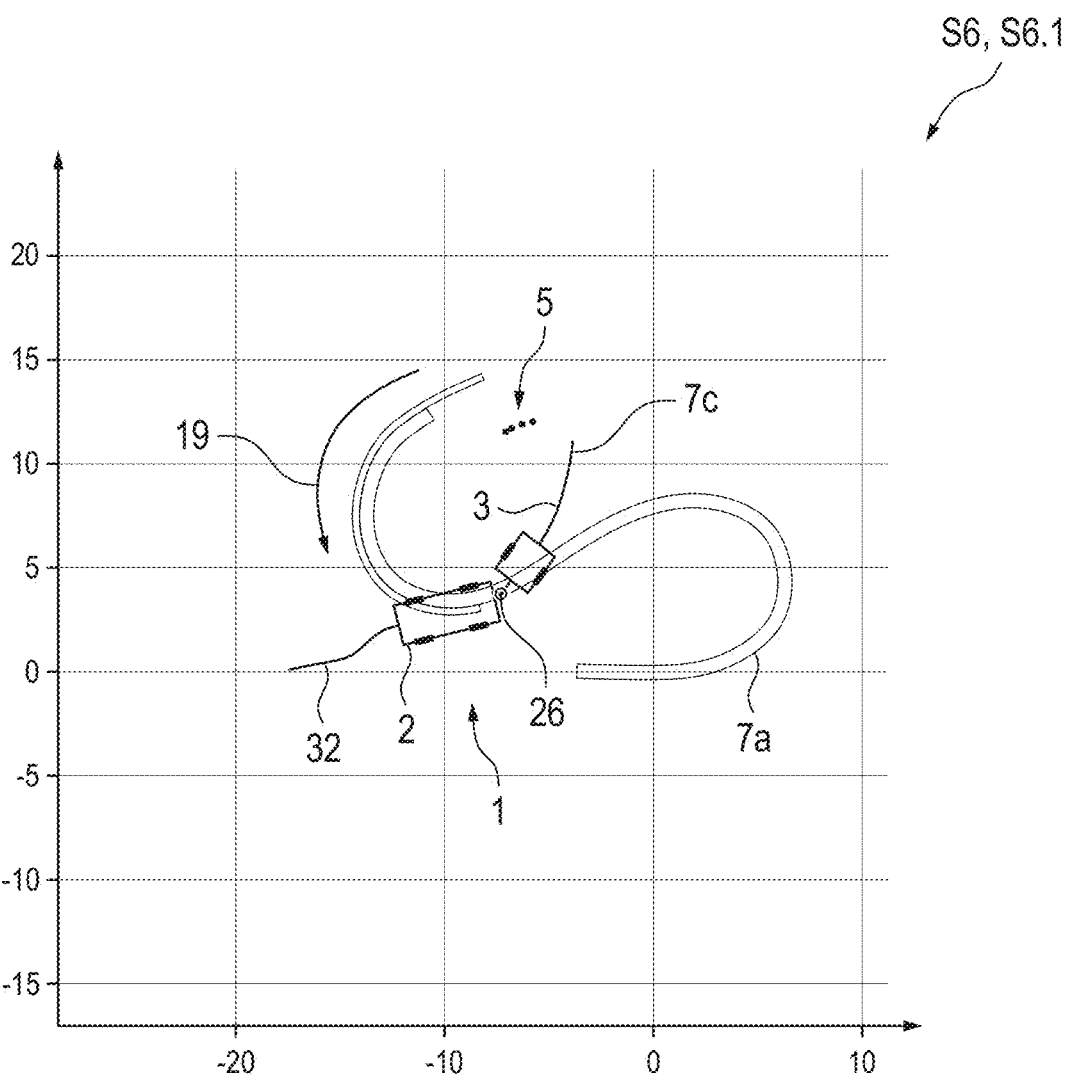
FIG. 7 an example schematic plan view of the vehicle-trailer combination, wherein an actual reversing trajectory of a trailer vehicle of the trailer deviates from the collision-free, newly planned reversing trajectory.

FIG. 7 shows a schematic plan view of the trailer 1, wherein an actual reversing trajectory of a trailer vehicle of the trailer 1 deviates from the collision-free, newly planned reversing trajectory 7a. In a step S6 of the method, a current deviation of an actual reversing trajectory 7b of the trailer vehicle 3 from the new reversing trajectory 7a is determined by means of a deviation detection unit of the driver assistance system during assisted reversing. If the current deviation is greater than a permissible limit deviation, the trailer 1 is completely stopped by means of the driver assistance system to perform a corrective action. The corrective action can be performed completely or partially by the driver assistance system. After the corrective action has been performed, the assisted reversing is resumed or, respectively, reactivated.

Figure 8:
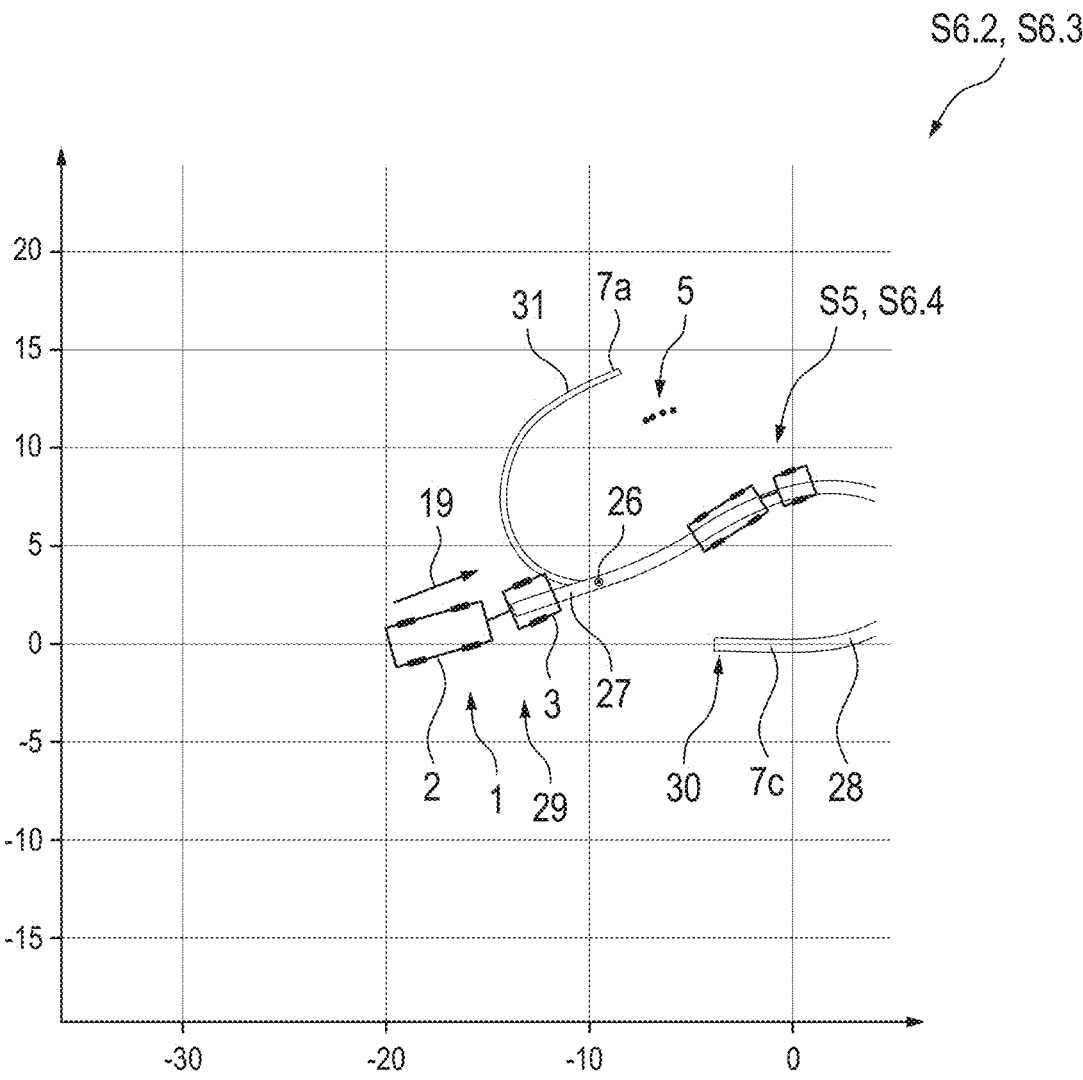
FIG. 8 an example schematic plan view of the vehicle-trailer combination when performing a forward correction.

According to the presently described example, in a step S6.1, a deviation point 26 lying on the new reversing trajectory 7a is determined, in the present case by means of a deviation detection module of the driver assistance system, for the corrective action. At the deviation point 26, the deviation of the actual trailer vehicle reversing trajectory 7b has exceeded the limit deviation. In a step S6.2, it is then provided that a forward correction is performed, during which the trailer is driven forwards. This is shown in FIG. 8. Thus, to perform the forward correction, the direction of travel of the trailer 1 or, respectively, the towing vehicle 2 is switched. Then, in a step S6.3, a corrected reversing trajectory 7c is generated by means of the reversing trajectory generation module. This trajectory has two trajectory portions 27, 28, namely a first trajectory portion 27 and a second trajectory portion 28 adjoining the first. The first trajectory portion 27 connects an end position 29 of the trailer, which it has reached after the forward correction, and the deviation point 26. The second trajectory portion 28 connects the deviation point 26 and an end 30 of the new reversing trajectory 7a. For this purpose, the second trajectory portion 28 is planned such that, between the deviation point 26 and the end 30 of the new reversing trajectory 7a, it deviates from the new reversing trajectory as little as possible. It is also provided that a previously successfully completed portion 31 of the new reversing trajectory 7a is deleted from the ring memory of the driver assistance system in order to save storage capacity. In a step S6.4, the trailer 1 is reversed with the aid of the driver assistance system, wherein the driver assistance system intervenes in the transverse guidance of the towing vehicle 2 at least such that the trailer 1 is driven along the corrected reversing trajectory 7c.

In the present case, it is provided that the driver assistance system completely takes over the transverse guidance and/or longitudinal guidance of the towing vehicle 2 in step S6.4. In other words, reversing with the trailer 1 along the corrected reversing trajectory 7c takes place fully autonomously.

In some embodiments, an ideal end position for the forward correction is planned by means of the driver assistance system. The ideal end position is characterized in particular in that it can be achieved particularly simply or, respectively, efficiently with the trailer 1 and is exactly far enough away from the new reversing trajectory 7a that returning to the new reversing trajectory 7a after the forward correction is particularly simple. By means of the driver assistance system, a correction trajectory 32 (see FIG. 7) toward the ideal end position is then planned for the forward correction, for example, by means of the reversing trajectory generation module. The correction trajectory 32 can be a straight line or a non-straight curve. Furthermore, the correction trajectory 32 can have both straight and non-straight portions. The forward correction along the correction trajectory 32 is then performed. Before, simultaneously, or after, the first trajectory portion 27, which is, as described above, part of the corrected reversing trajectory 7c, is planned between the ideal end position and the deviation point 26 by means of the driver assistance system.

To perform the forward correction, complete control of the longitudinal and transverse guidance of the towing vehicle 2 is transferred to its human driver, following which the driver performs the forward correction with the trailer 1. In this case, the driver can be supported by the driver assistance system—even if said system does not actively intervene in longitudinal and/or transverse guidance of the towing vehicle 2 in such a case—for instance in that the driver is shown the forward correction to be driven, for example, on a display of the towing vehicle 2. In the present case, it is provided that the driver assistance system completely takes over the transverse guidance 2 and/or longitudinal guidance of the towing vehicle 2 to perform the forward correction. This means that performing the forward correction is performed partially or fully autonomously.

It is provided in particular that the steps S1 to S5 are applied analogously in order to perform the forward correction and to return to the new reversing trajectory 7a via the deviation point 26.

The current deviation of the actual trailer vehicle reversing trajectory 7b from the new reversing trajectory 7a is determined, for example, in that, during the reversing assisted by means of the driver assistance system, a euclidean distance between the actual trailer vehicle reversing trajectory 7b and the current position point is determined at a current position point of the trailer 1 lying on the new reversing trajectory 7a. Alternatively or additionally, the current deviation is determined in that, during reversing, an angle between a tangent branching off from the new reversing trajectory 7a at the current position point and a tangent of the actual trailer vehicle reversing trajectory 7b is determined at the current position point of the trailer 1.

LIST OF REFERENCE NUMERALS

1 Trailer
2 Towing vehicle
3 Trailer vehicle
4 Forward trajectory of the trailer
4a Forward trajectory of the towing vehicle
4b Forward trajectory of the trailer vehicle
5 Object
6 Collision object
6a Outer contour point
7 Reversing trajectory of the trailer
7a New reversing trajectory
7b Actual trailer vehicle reversing trajectory
7c Corrected reversing trajectory
8 Reversing corridor of the towing vehicle
8a New reversing corridor of the towing vehicle
9 Reversing corridor of the trailer vehicle
9a New reversing corridor of the trailer vehicle
10 First new reversing trajectory portion
11 First new reversing corridor portion of the towing vehicle
12 First new reversing corridor portion of the trailer vehicle
13 Problem point
14 Tangent
15 Perpendicular
16 New planning point
17 Sensor range
18 Departure point
19 Reversing direction
20 Return point
21 Second new reversing trajectory portion
22 Second new reversing corridor portion of the towing vehicle
23 Second new reversing corridor portion of the trailer vehicle
24 First collision rectangle
25 Circle
26 Deviation point

27 First trajectory portion of the corrected reversing trajectory

28 Second trajectory portion of the corrected reversing trajectory

29 End position

30 End of the new reversing trajectory

31 Successfully completed portion of the new reversing trajectory

32 Correction trajectory

S1-S6,

S6.1-S6.4 Method steps

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for assisted reversing with a trailer combination having a towing vehicle and a coupled trailer vehicle, wherein the trailer combination is initially driven forwards, comprising:

storing a corresponding forward trajectory in a driver assistance system;

detecting, using a sensor system of the towing vehicle and at least while driving forward, at least one object arranged laterally next to the forward trajectory;

planning the following:

a) a reversing trajectory, which deviates no more than a permissible limit deviation from the driven forward trajectory; and b) at least a first and a separate second vehicle-specific reversing corridor corresponding to the planned reversing trajectory;

classifying the detected at least one object as a collision object if the at least one corresponding object lies in one or more of the planned reversing corridors;

selectively generating, if one or more of the at least one detected object has been classified as a collision object, a new reversing trajectory and, as a result, at least a new first and a new separate second vehicle-specific reversing corridor, which deviates no more than the permissible limit deviation from the reversing corridor planned, such that the collision object does not lie the new vehicle-specific reversing corridors;

reversing the trailer combination with the aid of the driver assistance system, wherein the driver assistance system intervenes in transverse guidance of the towing vehicle at least such that the trailer combination is driven along the reversing trajectory or the new reversing trajectory, respectively, and, as a result, through the vehicle-specific reversing corridors or the new vehicle-specific reversing corridors, respectively;

determining a current deviation of an actual reversing trajectory of the trailer vehicle from the reversing trajectory or the new reversing trajectory, respectively, using the driver assistance system during assisted reversing; and when the current deviation is greater than a permissible limit deviation, selectively stopping the trailer combination completely using the driver assistance system and resuming the assisted reversing after a corrective action has been performed.

2. The method of claim 1, wherein the driver assistance system completely takes over the transverse guidance of the towing vehicle and/or longitudinal guidance of the towing vehicle during reversing.

3. The method of claim 1, wherein the corrective action comprises:

using the driver assistance system, determining a deviation point lying on the new reversing trajectory, at which the deviation of the actual trailer vehicle reversing trajectory has exceeded the limit deviation;

performing a forward correction, in which the trailer combination is driven forwards;

using the driver assistance system, generating a corrected reversing trajectory, having:

a) a first trajectory portion between an end position of the trailer after the forward correction and the deviation point; and b) a second trajectory portion between the deviation point and an end of the new reversing trajectory;

using the driver assistance system, reversing the trailer combination, wherein the driver assistance system intervenes in transverse guidance of the towing vehicle at least such that the trailer combination is driven along the corrected reversing trajectory.

4. The method of claim 3, wherein the driver assistance system completely takes over the transverse guidance of the towing vehicle and/or longitudinal guidance of the towing vehicle during reversing the trailer combination along the corrected reversing trajectory.

5. The method of claim 3, wherein:

an ideal end position for the forward correction is planned using the driver assistance system;

a correction trajectory toward the ideal end position is planned for the forward correction using the driver assistance system;

the forward correction along the correction trajectory is performed;

the first trajectory portion is planned between the ideal end position and the deviation point using the driver assistance system.

6. The method of claim 3, wherein complete control of longitudinal and transverse guidance of the towing vehicle is transferred to its human driver to perform the forward correction, following which the driver performs the forward correction.

7. The method of claim 3, wherein the driver assistance system completely takes over the transverse guidance of the towing vehicle and/or longitudinal guidance of the towing vehicle to perform the forward correction.

8. The method of claim 1, wherein the current deviation of the actual trailer vehicle reversing trajectory from the new reversing trajectory is determined in that, during the reversing assisted using the driver assistance system, at one current position point of the trailer combination lying on the new reversing trajectory;

a Euclidean distance between the actual trailer vehicle reversing trajectory and the current position point is determined; and/or an angle between a tangent branching off from the new reversing trajectory at the current position point and a tangent of the actual trailer vehicle reversing trajectory is determined.

9. A driver assistance system configured to perform a method for assisted reversing with a trailer combination having a towing vehicle and a coupled trailer vehicle, wherein the trailer combination is initially driven forwards, the method comprising:

storing a corresponding forward trajectory in the driver assistance system;

detecting, using a sensor system of the towing vehicle and at least while driving forward, at least one object arranged laterally next to the forward trajectory; planning the following:

a) a reversing trajectory, which deviates no more than the permissible limit deviation from the driven forward trajectory; and b) at least a first and a separate second vehicle-specific reversing corridor corresponding to the planned reversing trajectory;

classifying the detected at least one object as a collision object if the at least one corresponding object lies in one or more of the planned reversing corridors;

selectively generating, if one or more of the at least one detected object has been classified as a collision object, a new reversing trajectory and, as a result, a new first and a new separate second vehicle-specific reversing corridor, which deviates no more than the permissible limit deviation from the reversing corridor planned, such that the collision object does not lie in either of the new vehicle-specific reversing corridors;

reversing the trailer combination with the aid of the driver assistance system, wherein the driver assistance system intervenes in transverse guidance of the towing vehicle at least such that the trailer combination is driven along the reversing trajectory or the new reversing trajectory, respectively, and, as a result, through the vehicle-specific reversing corridors or the new vehicle-specific reversing corridors, respectively;

determining a current deviation of an actual reversing trajectory of the trailer vehicle from the reversing trajectory or the new reversing trajectory, respectively, using the driver assistance system during assisted reversing; and when the current deviation is greater than a permissible limit deviation, selectively stopping the trailer combination completely using the driver assistance system and resuming the assisted reversing after a corrective action has been performed.

10. A motor vehicle with the driver assistance system of claim 9, wherein the motor vehicle is configured to function as the towing vehicle for the trailer combination.

11. The driver assistance system of claim 9, wherein the driver assistance system completely takes over the transverse guidance of the towing vehicle and/or longitudinal guidance of the towing vehicle during reversing.

12. The driver assistance system of claim 9, wherein the corrective action comprises:

using the driver assistance system, determining a deviation point lying on the new reversing trajectory, at which the deviation of the actual trailer vehicle reversing trajectory has exceeded the limit deviation;

performing a forward correction, in which the trailer combination is driven forwards;

using the driver assistance system, generating a corrected reversing trajectory, having:

a) a first trajectory portion between an end position of the trailer combination after the forward correction and the deviation point; and b) a second trajectory portion between the deviation point and an end of the new reversing trajectory;

using the driver assistance system, reversing the trailer combination, wherein the driver assistance system intervenes in transverse guidance of the towing vehicle at least such that the trailer combination is driven along the corrected reversing trajectory.

13. The driver assistance system of claim 12, wherein the driver assistance system completely takes over the transverse guidance of the towing vehicle and/or longitudinal guidance of the towing vehicle during reversing the trailer combination along the corrected reversing trajectory.

14. The driver assistance system of claim 12, wherein:

an ideal end position for the forward correction is planned using the driver assistance system;

a correction trajectory toward the ideal end position is planned for the forward correction using the driver assistance system;

the forward correction along the correction trajectory is performed;

the first trajectory portion is planned between the ideal end position and the deviation point using the driver assistance system.

15. The driver assistance system of claim 12, wherein complete control of longitudinal and transverse guidance of the towing vehicle is transferred to its human driver to perform the forward correction, following which the driver performs the forward correction.

16. The driver assistance system of claim 12, wherein the driver assistance system completely takes over the transverse guidance of the towing vehicle and/or longitudinal guidance of the towing vehicle to perform the forward correction.

17. The driver assistance system of claim 9, wherein the current deviation of the actual trailer vehicle reversing trajectory from the new reversing trajectory is determined in that, during the reversing assisted using the driver assistance system, at one current position point of the trailer combination lying on the new reversing trajectory;

a Euclidean distance between the actual trailer vehicle reversing trajectory and the current position point is determined; and/or an angle between a tangent branching off from the new reversing trajectory at the current position point and a tangent of the actual trailer vehicle reversing trajectory is determined.

18. The method of claim 2, wherein the corrective action comprises:

using the driver assistance system, determining a deviation point lying on the new reversing trajectory, at which the deviation of the actual trailer vehicle reversing trajectory has exceeded the limit deviation;

performing a forward correction, in which the trailer combination is driven forwards;

using the driver assistance system, generating a corrected
  reversing trajectory, having:
    a) a first trajectory portion between an end position of
      the trailer combination after the forward correction
      and the deviation point; and
    b) a second trajectory portion between the deviation
      point and an end of the new reversing trajectory;
using the driver assistance system, reversing the trailer
  combination, wherein the driver assistance system
  intervenes in transverse guidance of the towing vehicle
  at least such that the trailer combination is driven along
  the corrected reversing trajectory.

19. The method of claim 4, wherein:
an ideal end position for the forward correction is planned
  using the driver assistance system;
a correction trajectory toward the ideal end position is
  planned for the forward correction using the driver
  assistance system;
the forward correction along the correction trajectory is
  performed;
the first trajectory portion is planned between the ideal
  end position and the deviation point using the driver
  assistance system.

20. The method of claim 4, wherein complete control of
longitudinal and transverse guidance of the towing vehicle is
transferred to its human driver to perform the forward
correction, following which the driver performs the forward
correction.

\*    \*    \*    \*    \*